United States Patent Office.

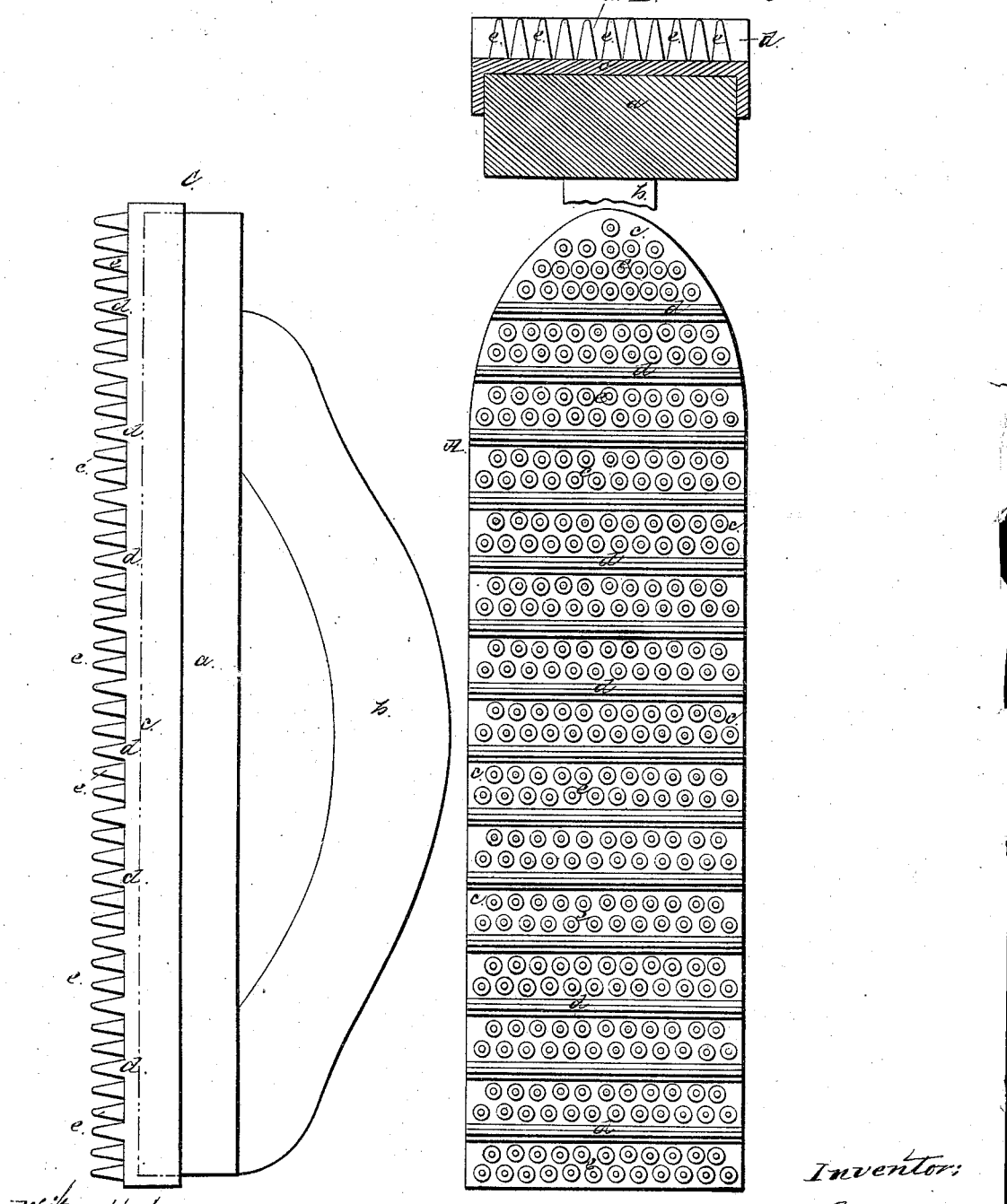

BENJAMIN I. LANE, OF FRAMINGHAM, MASSACHUSETTS.

Letters Patent No. 66,856, dated July 16, 1867.

IMPROVED SCRUBBING-UTENSIL.

*The Schedule referred to in these Letters Patent and making part of the same.*

TO ALL WHOM IT MAY CONCERN:

Be it known that I, B. I. LANE, of Framingham, in the county of Middlesex, and State of Massachusetts, have invented an Improved Scrubbing-Utensil; and I do hereby declare that the following, taken in connection with the drawings which accompany and form part of this specification, is a description of my invention sufficient to enable those skilled in the art to practise it.

The invention relates to the construction of scrubbers, or instruments to be used instead of scrubbing-brushes for cleaning floors, paints, &c., such instruments being made of caoutchouc or compounds thereof, preferably combined with fine sand, emery, or other abrasive powder, in the process of vulcanization.

The invention consists, primarily, in forming the rubbing surface of the scrubber of a series of projections formed of caoutchouc, or equivalent elastic material, and abrasive powder combined together; and in constructing the acting surface of alternate series of bars and teats or drops, the bars acting not only as rubbing edges, but as a sort of support to the teats, while the latter serve to penetrate into such uneven surfaces as would not be reached by the edges of the bars. The drawings represent a scrubbing instrument constructed in accordance with my invention—

A showing a bottom view,

B, a side elevation, and

C, a cross-section of the instrument.

$a$ denotes the wooden block; $b$, the handle; $c$, the rubber block. The rubber is moulded in the form of a flat, shallow box, into which the block $a$ fits, as seen at C, and by dotted lines at B, the surface of the rubber coming against the block being preferably made adhesive to cement the block thereto. Projecting from the bottom of the rubber $c$, and formed integral therewith, are series of parallel lips or bars $d$, the lower edge of each of which is made thin, so as to make a scraping edge. Between each two adjacent bars $d$, and projecting down from the rubber $c$, to the same depth as the bars, as seen at B and C, are one or more series of teats or long points $e$ of rubber or caoutchouc, formed integral with the rubber or caoutchouc $c$. The action of the bars and tips or points in connection will be readily understood. If the friction surface were made with only the points, they would yield too readily in a body, and if the bars alone formed the rubbing devices, their straight and laterally unyielding edges would fail to accommodate themselves to the unevenness of the surface to be cleaned; but by combining them together, the necessary rigidity is obtained in the surface, with the desirable lateral flexibility necessary to reach all parts of the surfaces upon which the utensil is used. These bars and rubbing points are preferably made, as before stated, with an abrasive powder as an ingredient in their composition, combining it with the caoutchouc in the process of vulcanizing them, in such quantity as to give to them an abrasive power, while not impairing materially the cohesion of the rubber. A scrubbing instrument having this construction is found to possess great advantages over a common scrubbing-brush, both as to efficiency and enduring power.

I claim a scrubbing-brush or utensil, the friction-surface of which is composed of caoutchouc, or equivalent elastic material, and abrasive powder combined together, substantially as set forth.

I also claim forming the friction surface of a scrubbing-brush or utensil of alternate rows of bars and teats or points of caoutchouc, or equivalent elastic material or compound, substantially as shown and described.

I also claim forming the rubbing surfaces as projections from a rubber block, $c$, into which the handle-block $a$ is inserted, substantially as shown and described.

BENJ'N I. LANE.

Witnesses:
F. GOULD,
J. B. CROSBY.